(12) United States Patent
Nagamine

(10) Patent No.: US 9,276,837 B2
(45) Date of Patent: Mar. 1, 2016

(54) ROUTE SETTING APPARATUS, ROUTE SETTING METHOD, AND NETWORK SYSTEM

(71) Applicant: FUJITSU LIMITED, Kawasaki-shi, Kanagawa (JP)

(72) Inventor: Kazuaki Nagamine, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 14/103,191

(22) Filed: Dec. 11, 2013

(65) Prior Publication Data

US 2014/0269696 A1  Sep. 18, 2014

(30) Foreign Application Priority Data

Mar. 18, 2013  (JP) ................. 2013-055665

(51) Int. Cl.
*H04L 12/28* (2006.01)
*H04L 12/721* (2013.01)

(52) U.S. Cl.
CPC .................... *H04L 45/123* (2013.01)

(58) Field of Classification Search
USPC .......................... 370/252, 389, 392, 401, 469
See application file for complete search history.

(56) References Cited

U.S. PATENT DOCUMENTS

| 5,483,370 | A | 1/1996 | Takahashi |
| 7,075,944 | B1 | 7/2006 | Takagi |
| 2002/0143972 | A1* | 10/2002 | Christopoulos ... H04L 29/06027 709/231 |
| 2006/0002320 | A1* | 1/2006 | Costa-Requena ..... H04L 12/189 370/312 |
| 2012/0155874 | A1* | 6/2012 | Lin ........................... H04J 3/12 398/58 |
| 2012/0294610 | A1* | 11/2012 | Genthner ............... H04J 3/1652 398/45 |
| 2013/0028602 | A1* | 1/2013 | Fu ........................... H04L 45/10 398/58 |
| 2014/0016925 | A1* | 1/2014 | Ceccarelli ............. H04J 3/1652 398/5 |

FOREIGN PATENT DOCUMENTS

| JP | 4-10722 | 1/1992 |
| JP | 11-41207 | 2/1999 |
| JP | 2001-144778 | 5/2001 |

* cited by examiner

*Primary Examiner* — Ricky Ngo
*Assistant Examiner* — Christine Ng
(74) *Attorney, Agent, or Firm* — Staas & Halsey LLP

(57) ABSTRACT

A route setting apparatus having a processor and a memory which stores an instruction to cause the processor to generate a layer label in which a first signal type for transmission of a main signal is described on a layer-by-layer basis, to store, on a layer-by-layer basis, a score correspondingly associated with one or more of second signal types, and to generate data based on the score correspondingly associated for one of the second signal types that matches the first signal type in the layer label. The instruction causes the processor to determine an optimal route based on the generated data which includes data received from another apparatus included in a route for the transmission of the main signal, and transmit and receive the layer label and the generated data.

19 Claims, 10 Drawing Sheets

| ODU1 (SCORE:d1) | ODU2 (SCORE:d2) | ODU3 (SCORE:d3) | PASS-THROUGH (SCORE:d4) |
|---|---|---|---|
| OTU1 (SCORE:c1) | OTU2 (SCORE:c2) | OTU3 (SCORE:c3) | PASS-THROUGH (SCORE:c4) |
| FEC#1 (SCORE:b1) | FEC#2 (SCORE:b2) | FEC#3 (SCORE:b3) | PASS-THROUGH (SCORE:b4) |
| OCh(2.6G) (SCORE:a1) | OCh(10.7G) (SCORE:a2) | OCh(43G) (SCORE:a3) | PASS-THROUGH (SCORE:a4) |

FIG. 2

| Column number | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| R O W | 1 | | | | FAS | | | | | | | | | | | | |
| | 2 | RES | | | TC MA CT | TCM6 | | | TCM5 | | | TCM4FTFL | | | OPU OVERHEAD | | |
| | 3 | TCM3 | | | TCM2 | | | TCM1 | | | PM | | | EXP | | | |
| | 4 | GCC1 | | GCC2 | | APS/PCC | | | | | | RES | | | | | |
| | | | | | | | | | | OTU OVERHEAD | | | | | | | |
| | | | | | | | | PAYLOAD AREA | | | | | | | | | FEC AREA |

FAS: FRAME ALIGNMENT SIGNAL
OTU: OPTICAL CHANNEL TRANSPORT UNIT
ODU: OPTICAL CHANNEL DATA UNIT
RES: RESERVE
TCM: TANDEM CONNECTION MONITORING
FTFL: FAULT TYPE & FAULT LOCATION REPORTING CHANNEL

EXP: EXPERIMENTAL
GCC: GENERAL COMMUNICATION CHANNEL
APS: AUTOMATIC PROTECTION SWITCHING COORDINATION CHAN
PCC: PROTECTION COMMUNICATION CONTROL CHANNEL
OPU: OPTICAL CHANNEL PAYLOAD UNIT
FEC: FORWARD ERROR CORRECTION

FIG. 4A

| ODU1 (SCORE:d1) | ODU2 (SCORE:d2) | ODU3 (SCORE:d3) |
|---|---|---|
| OTU1 (SCORE:c1) | OTU2 (SCORE:c2) | OTU3 (SCORE:c3) |
| FEC#1 (SCORE:b1) | FEC#2 (SCORE:b2) | FEC#3 (SCORE:b3) |
| OCh(2.6G) (SCORE:a1) | OCh(10.7G) (SCORE:a2) | OCh(43G) (SCORE:a3) |

| PASS-THROUGH (SCORE:d4) |
|---|
| PASS-THROUGH (SCORE:c4) |
| PASS-THROUGH (SCORE:b4) |
| PASS-THROUGH (SCORE:a4) |

FIG. 4B

| d4 |
|---|
| c3 |
| b1 |
| a3 |

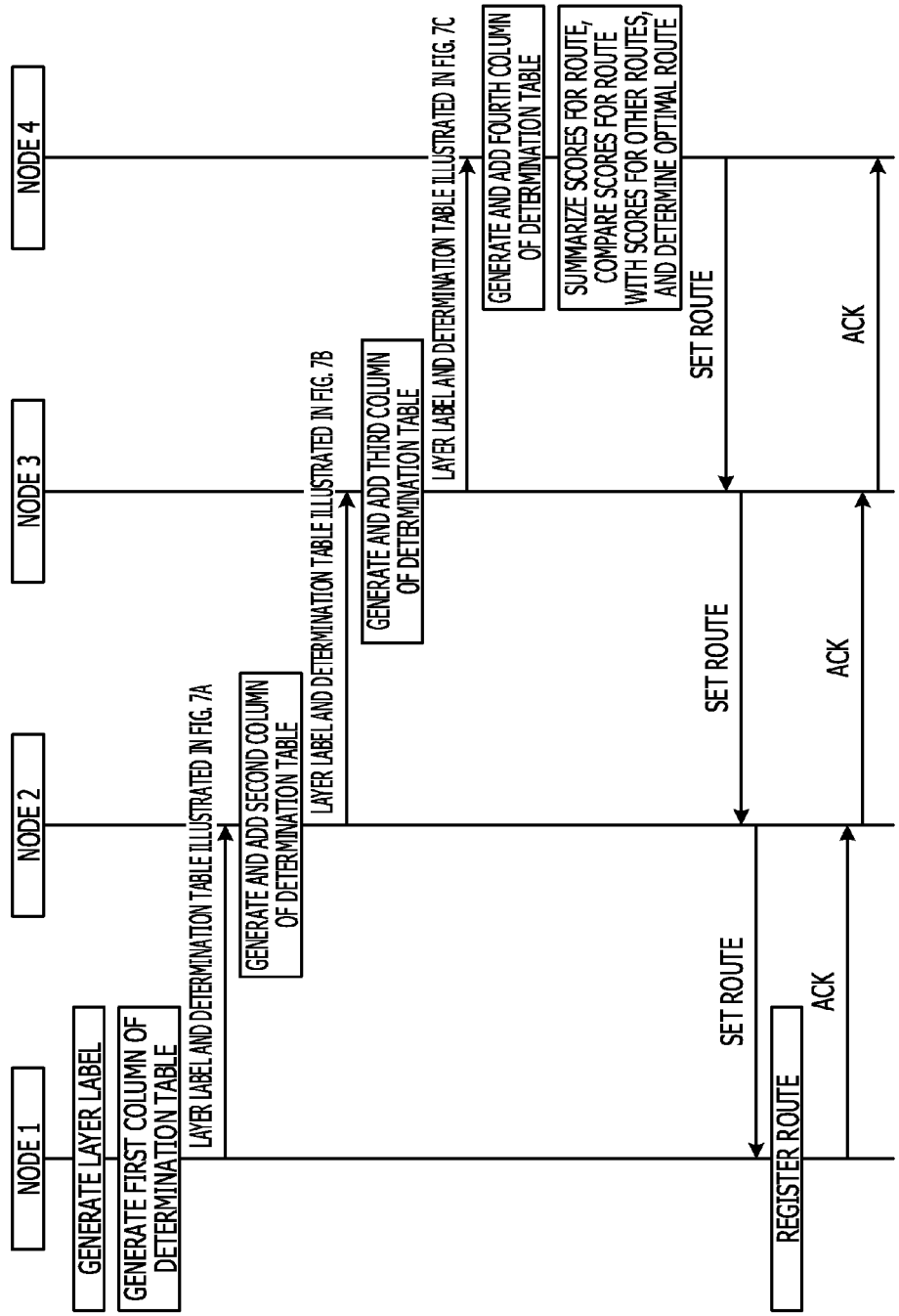

FIG. 7A

| ODU | N1 |
|---|---|
| OUT | d4 |
| FEC | c3 |
| OCh | b1 |
|  | a3 |

FIG. 7B

| ODU | N1 | N2 |
|---|---|---|
| OUT | d4 | d4 |
| FEC | c3 | c3 |
| OCh | b1 | b1 |
|  | a3 | a3 |

FIG. 7C

| ODU | N1 | N2 | N3 |
|---|---|---|---|
| OUT | d4 | d4 | d4 |
| FEC | c3 | c3 | c3 |
| OCh | b1 | b1 | b1 |
|  | a3 | a3 | a3 |

FIG. 7D

| ODU | N1 | N2 | N3 | N4 | N4' |
|---|---|---|---|---|---|
| OUT | d4 | d4 | d4 | d4 | d4 |
| FEC | c3 | c3 | c3 | c3 | c3 |
| OCh | b1 | b1 | b1 | b1 | b1 |
|  | a3 | a3 | a3 | a3 | a3 |

FIG. 7E

| ODU | N1 | N2 | N3 | N4 | N4' | N3' |
|---|---|---|---|---|---|---|
| OUT | d4 | d4 | d4 | d4 | d4 | d4 |
| FEC | c3 | c3 | c3 | c3 | c3 | c3 |
| OCh | b1 | b1 | b1 | b1 | b1 | b1 |
|  | a3 | a3 | a3 | a3 | a3 | a3 |

FIG. 7F

| ODU | N1 | N2 | N3 | N4 | N4' | N3' | N2' |
|---|---|---|---|---|---|---|---|
| OUT | d4 | d4 | d4 | d4 | d4 | d4 | d4 |
| FEC | c3 | c3 | c3 | c3 | c3 | c3 | c3 |
| OCh | b1 | b1 | b1 | b1 | b1 | b1 | b1 |
|  | a3 | a3 | a3 | a3 | a3 | a3 | a3 |

FIG. 7G

| ODU | N1 | N2 | N3 | N4 | N4' | N3' | N2' | N1' |
|---|---|---|---|---|---|---|---|---|
| OUT | d4 | d4 | d4 | d4 | d4 | d4 | d4 | d4 |
| FEC | c3 | c3 | c3 | c3 | c3 | c3 | c3 | c3 |
| OCh | b1 | b1 | b1 | b1 | b1 | b1 | b1 | b1 |
|  | a3 | a3 | a3 | a3 | a3 | a3 | a3 | a3 |

ROUTE SETTING APPARATUS, ROUTE SETTING METHOD, AND NETWORK SYSTEM

CROSS-REFERENCE TO RELATED APPLICATION

This application is based upon and claims the benefit of priority of the prior Japanese Patent Application No. 2013-055665, filed on Mar. 18, 2013, the entire contents of which are incorporated herein by reference.

FIELD

Embodiments discussed herein are related to apparatuses, methods and a system for setting an optimal route.

BACKGROUND

When an apparatus has received a frame using a different protocol, the apparatus converts the frame, and transfers the converted frame using tunneling. An apparatus that has received such a frame refers to information stored in the header portion of the frame, and determines whether or not to terminate or transfer the frame.

A related technique is described in Japanese Laid-open Patent Publication No. 2001-144778.

SUMMARY

According to one aspect of the embodiments, a route setting apparatus includes a processor and a memory which stores an instruction to cause the processor to generate a layer label in which a first signal type for transmission of a main signal is described on a layer-by-layer basis, to store, on a layer-by-layer basis, a score correspondingly associated with one or more second signal types. The processor is caused to generate data based on the score correspondingly associated for one of the second signal types that matches the first signal type in the layer label, to determine an optimal route based on the generated data which includes data received from another apparatus included in a route for the transmission of the main signal, and transmit and receive the layer label and the generated data The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a frame format;
FIG. 4A illustrates an example of a support table;
FIG. 4B illustrates an example of a determination table;
FIG. 6 illustrates an example of formation of a tunneling route;
FIGS. 7A to 7G illustrate examples of a determination table.

DESCRIPTION OF EMBODIMENTS

Frames using the same protocol are used in order to establish a connection between apparatuses provided by different vendors or between different networks. For example, one portion of each of the frames may be uniquely defined by each of vendors, whereby functions unique to the vendors may be provided. In the case where the frames using the same protocol are processed, among the frames, a frame including a frame header having one portion that is uniquely defined by one of the venders may be discarded as an error frame. In order to avoid discarding such a frame, the functions unique to the vendors are disabled, or layers to be terminated by individual nodes are set on a node-by-node basis.

Network Configuration

Figure 1:
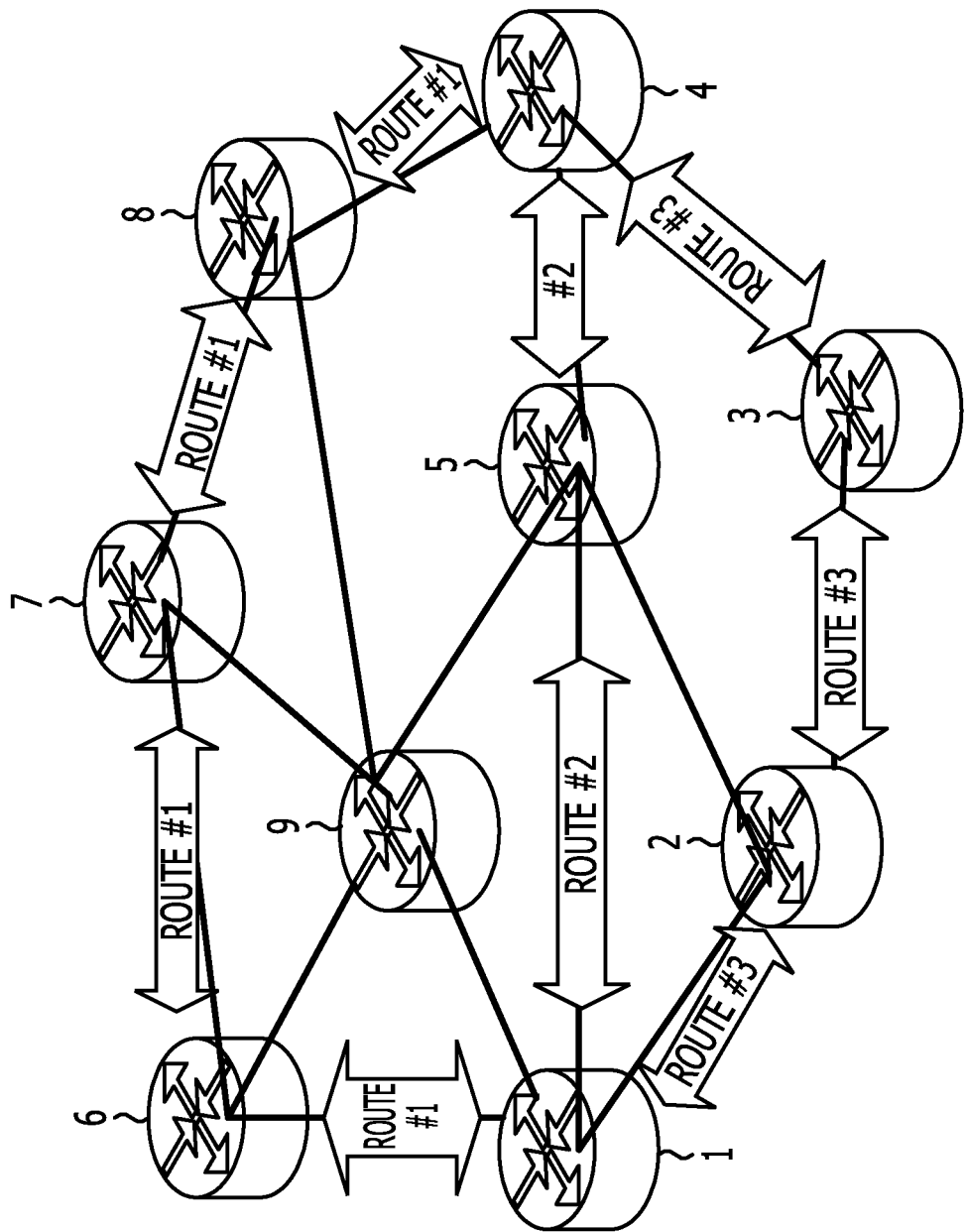
FIG. 1 illustrates an example of a network configuration.

FIG. 1 illustrates an example of a network configuration. A network illustrated in FIG. 1 includes multiple nodes 1 to 9, and is formed as a mesh network. For example, regarding the network configuration, the network may be a network having any formation in which one or multiple routes are provided. Multiple networks may be coupled to each other. Different apparatuses provided by one or multiple venders may be present within one network.

As illustrated in FIG. 1, multiple routes, for example, routes #1 to #3, may be present between the node 1 and the node 4. An optimal route from the node 1 to the node 4 may be determined. The node 1 generates a layer label in which signal types that are used in a main signal which is to be transmitted by the node 1 or a main signal received from a different network are described, and transmits the layer label to the node 4 via the individual routes (the routes #1 to #3).

Each of the nodes provided along each of the routes compares the layer label and signal types supported by the own node on a layer-by-layer basis, gives scores, and transfers the layer label to the next-stage node. Each of the nodes adds a scoring result of the own node to the scoring result obtained by the previous-stage node, and further transfers a new result to the next-stage node.

For example, for the route #3, the node 1 generates a layer label, compares the layer label with the signal types supported by the node 1 on a layer-by-layer basis, and gives scores. The node 1 transfers the layer label and a scoring result to the node 2.

The node 2 compares the layer label, which has been received from the node 1, and signal types supported by the node 2 on a layer-by-layer basis, and gives scores. The node 2 transfers the layer label, the scoring result of the node 1, and a scoring result of the node 2 to the node 3.

The node 3 compares the layer label, which has been received from the node 2, and signal types supported by the node 3 on a layer-by-layer basis, and gives scores. The node 3 transfers the layer label, the scoring result of the node 1, the scoring result of the node 2, and a scoring result of the node 3 to the node 4.

The node 4 compares the layer label, which has been received from the node 3, and signal types supported by the node 4 on a layer-by-layer basis, and gives scores. The node 4 summarizes the scoring results obtained by the nodes 1 to 3 and a scoring result obtained by the node 4.

For each of the other routes, for example, for each of the routes 1 and 2, similarly, a layer label and scoring results obtained by the individual nodes are transferred, and the scoring results obtained by the individual nodes are summarized.

The node 4 compares the summarized scoring results for the individual routes #1 to #3 with one another, and determines, as an optimal route, a route having the highest score. The nodes 1 to 4 set the determined optimal route.

For example, by setting multiple highest-scored routes having the highest score, redundant routes may be set. Multiple routes may be prioritized.

For example, scores may be given also for a return route, and scoring results that include scoring results for the return route may be summarized. The scoring results may be summarized by the node 1 or a different apparatus.

In this manner, an optimal route among multiple routes may be determined.

Layer Label

FIG. 2 illustrates an example of a frame format. The frame format illustrated in FIG. 2 may be a frame format used in an optical transport network, and may correspond to a frame format specified in ITU-T recommendation G.709. Different vendors may provide apparatuses conforming to the frame format specified in G.709, whereby a connection may be established between different vendors or different network carriers.

Each of the vendors uniquely defines an undefined field included in overhead or forward error correction (FEC) of a frame in the frame format specified in G.709, whereby functions unique to the venders may be provided. In such a case, the vendors may disable the functions unique thereto, or layers that are to be terminated by the individual nodes may be set on a node-by-node basis, whereby connectivity between different vendors or different network carriers may be guaranteed.

The frame in the frame format specified in G.709 includes payload including a client signal, optical channel payload unit (OPU) overhead, optical channel data unit (ODU) overhead, optical channel transport unit (OTU) overhead, and FEC. The ODU overhead is located in rows 2 to 4 of columns 1 to 14 illustrated in FIG. 2.

Regarding optical channel (OC), multiple types of OCh (h=1, 2, 3, . . . ) that are distinguished from one another in accordance with the capacity (2.6G, 10.7G, 43G, and so forth) are provided.

Regarding OPU, ODU, OTU, multiple types of OPUx (x=1, 2, 3), multiple types of ODUx (x=1, 2, 3), and multiple types of OTUx (x=1, 2, 3), respectively, that are distinguished from one another in accordance with the capacity are provided. The OTUx is obtained by adding FEC to the ODUx. In G.709, reed-solomon error correction is used as FEC. However, FEC using a scheme unique to a vendor may be employed.

For example, the terms "OC", "OPU", "ODU", "OTU", and "FEC" may be referred to as an "OC layer", an "OPU layer", an "ODU layer", an "OTU layer", and an "FEC layer", respectively. The terms "OCh", "ODUx", and "OTUx", and a scheme of FEC may be referred to as a "signal type OCh", a "signal type ODUx", a "signal type OTUx", and a "signal type FEC#n", respectively.

Figure 3:
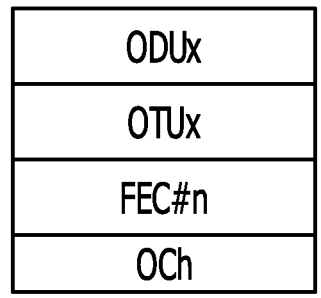
FIG. 3 illustrates an example of a layer label.

FIG. 3 illustrates an example of a layer label. Signal types for the individual layers used in a main signal are described in the layer label. The signal type OCh described at the bottom is a signal type for the lowest layer, and the signal type ODUx described at the top is a signal type for the highest layer.

Regarding the configuration of the layer label, the layer label may have layers different from the layers illustrated in FIG. 3 or the number of layers that is larger or smaller than the number of layers illustrated in FIG. 3.

One of the nodes determines signal types for the individual layers used in a main signal to be transmitted by the node, and generates a layer label. The node that generates a layer label may be an apparatus that is a transmission source of the main signal or an edge node that couples networks which use different carriers. For example, in the network illustrated in FIG. 1, the node that generates a layer label may be the node 1 that is a start point of the route #1.

The layer label is generated based on the overhead of each of the layers that have been added to the main signal by the node. For example, the layer label may be generated by a control apparatus or the like that is coupled to the node or that is integrated into the node. For example, the layer label may be set by an operator.

The layer label is associated with the main signal and is transferred within the network, and is referred to by the individual nodes that transmit and receive the main signal. The layer label is transferred using a sub-signal that is multiplexed into the main signal. Thus, a protocol that associates a data plane with a control plane may be undesirable. The layer label may be contemporaneously transmitted to multiple routes using multicast or broadcast.

Support Table and Determination Table

FIG. 4A illustrates an example of a support table. Each of the nodes included in the network has a support table in which signal types, for the individual layers, supported by the node are described.

One column of the support table may have a configuration that is substantially the same as the configuration of the layer label illustrated in FIG. 3. In the case where one of the nodes supports multiple signal types, the support table has multiple columns. The support table may include all of the signal types supported by the node, or may include only some of the signal types.

Referring to FIG. 4A, three signal types are supported for each of the layers. Referring to FIG. 4A, 2.6G, 10.7G, and 43G are supported as the signal type OCh, FEC#1, FEC#2, and FEC#3 are supported as the signal type FEC#n, OTU1, OTU2, OTU3 are supported as the signal type OTUx, and ODU1, ODU2, and ODU3 are supported as the signal type ODUx.

The support table has scores associated with the individual signal types. Referring to FIG. 4A, each of scores a1 to a3, b1 to b3, c1 to c3, and d1 to d3 is associated with a corresponding one of the signal types. These scores may be, for example, numerical values such as 20, 10, and 5 or 3, 2, and 1. For example, a higher score may be set for a signal type supported by a larger number of input and output interfaces. A higher score may be set for a signal type using highly-reliable hardware. A higher score may be set for a larger capacity that is supported. Scores may be set using any method.

Weights may be assigned to scores for the individual layers. Scores may be set in such a manner that the support table of a node which supports a larger number of signal types has scores relatively higher than the scores included in the support table of a different node. In the case where determination tables for multiple routes have the same values, it is possible to select routes along which various signal types are supportable for the future.

The support table has a column for pass-through. For example, the individual layers have a column for pass-through, and each of scores a4, b4, c4, and d4 is associated with a corresponding one of the layers. The scores associated with pass-through may be, for example, numerical values. The scores associated with pass-through may be set so as to be lower than the scores associated with the signal types that are supported, and may be, for example, 0.

Each of the nodes determines signal types supported by individual elements of the node, whereby the support table is automatically generated. For example, the support table may be generated by an operator, and may be stored in the node.

The node compares a layer label and the support table of the node, and determines scores on a layer-by-layer basis, thereby generating one column of a determination table. For example, the node compares signal types described in the layer label and the signal types supported by the node on a layer-by-layer basis, and determines scores associated with signal types that match. In the case where signal types described in the layer label and the signal types supported by the node do not match, the node uses the scores set in the column for pass-through.

The node compares the layer label and the support table in sequential order from the lowest layer to the highest layer. When the node detects that the signal types for a certain one of the layers do not match, the node no longer performs comparison for the certain layer and the layers higher than the layer, and determines that the signal types for all of the certain layer and the layers higher than the layer do not match. One column of the determination table is generated using, for the layers for which it is determined that the signal types do not match, the scores that are individually set in the column for pass-through.

FIG. 4B illustrates an example of a determination table. As illustrated in FIG. 4B, the scores determined for the individual layers are set in the format of a table having one column having a configuration substantially the same as the configuration of the layer label. Data corresponding to one column may be one column of the determination table. Each of the nodes that have received the layer label similarly generates one column of the determination table, and transfers the generated column to the downstream node provided along a route. The node that has received one column of the determination table from the upstream node adds one column generated by the node to the one column of the determination table that has been generated by the upstream node, and transfers the determination table to the further downstream node.

For the support table illustrated in FIG. 4A and the determination table illustrated in FIG. 4B, for example, a layer label may have 43G as the signal type OCh, FEC#1 as the signal type FEC#n, OTU3 as the signal type OTUx, and ODU3-α (an unique signal type) as the signal type ODUx. Each of the nodes that have received this layer label compares the signal types set in the layer label and the signal types set in the support table of the node on a layer-by-layer basis in order from the lowest layer.

Signal types as the signal type OCh are compared with each other. A signal type "43G" that matches 43G set as the signal type OCh in the layer label is included in the support table, and a score a3 is set for the signal type "43G". Thus, the node determines a3 as a score for the OC layer. Signal types as the signal type FEC#n are compared with each other. A signal type "FEC#1" that matches FEC#1 set as the signal type FEC#n in the layer label is included in the support table, and a score b1 is set for the signal type "FEC#1". Thus, the node determines b1 as a score for the FEC layer. Signal types as the signal type OTUx are compared with each other. A signal type "OTU3" that matches OTU3 set as the signal type OTUx in the layer label is included in the support table, and a score c3 is set for the signal type "OTU3". Thus, the node determines c3 as a score for the OTU layer. Finally, signal types as the signal type ODUx are compared with each other. A signal type that matches ODU3-α set as the signal type ODUx in the layer label is not included in the support table. Thus, the node determines, as a score for the ODU layer, d4 that is set in the column for pass-through.

The node generates, using the scores that have been determined in this manner, one column of the determination table illustrated in FIG. 4B.

Formation of Tunneling Route

Figure 5:
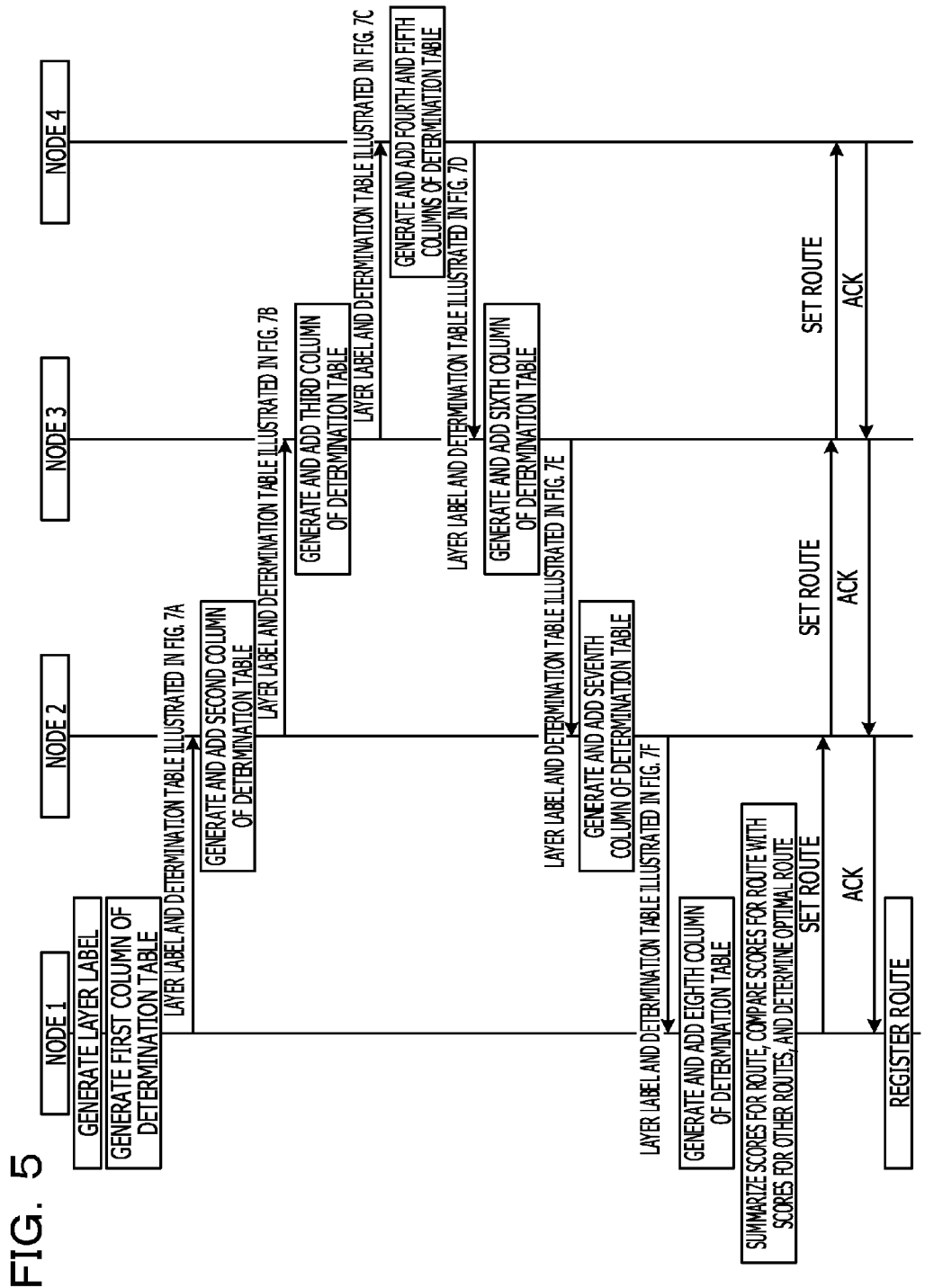
FIG. 5 illustrates an example of formation of a tunneling route.

FIGS. 5 and 6 illustrate an example of formation of a tunneling route. In FIGS. 5 and 6, signal flows for forming a tunneling route using a layer label and a determination table are illustrated. FIGS. 5 and 6 illustrate a four-way signal flow and a three-way signal flow for forming a tunneling route, respectively. Nodes 1 to 4 illustrated in FIGS. 5 and 6 may correspond to the nodes 1 to 4, respectively, provided along the route #3 illustrated in FIG. 1.

In FIG. 5, a signal flow for generating a determination table for the outward route #3 from the node 1 to the node 4 illustrated in FIG. 1 is illustrated.

The node 1 generates a layer label. The node 1 compares the layer label and the support table of the node 1, and determines scores on a layer-by-layer basis, thereby generating a first column of a determination table. The node 1 transfers the layer label and the generated first column of the determination table to the node 2. FIGS. 7A to 7G illustrate an example of a determination table. The first column of the determination table may correspond to, for example, FIG. 7A. Referring to FIGS. 7A to 7G, the first column of the determination table may be "N1".

The node 2 receives the layer label and the determination table illustrated in FIG. 7A from the node 1. The node 2 compares the layer label and the support table of the node 2, and determines scores on a layer-by-layer basis, thereby generating a second column of the determination table. The node 2 adds the second column of the determination table, which has been generated by the node 2, to the determination table illustrated in FIG. 7A, which has been received from the node 1, thereby generating a determination table illustrated in FIG. 7B. The node 2 transfers the layer label and the determination table illustrated in FIG. 7B to the node 3. Referring to FIGS. 7A to 7G, the second column of the determination table may be "N2".

The node 3 receives the layer label and the determination table illustrated in FIG. 7B from the node 2. The node 3 compares the layer label and the support table of the node 3, and determines scores on a layer-by-layer basis, thereby generating a third column of the determination table. The node 3 adds the third column of the determination table, which has been generated by the node 3, to the determination table illustrated in FIG. 7B, which has been received from the node 2, thereby generating a determination table illustrated in FIG. 7C. The node 3 transfers the layer label and the determination table illustrated in FIG. 7C to the node 4. Referring to FIGS. 7A to 7G, the third column of the determination table may be "N3".

The node 4 receives the layer label and the determination table illustrated in FIG. 7C from the node 3. The node 4 compares the layer label and the support table of the node 4, and determines scores on a layer-by-layer basis, thereby generating a fourth column of the determination table. The node 4 adds the fourth column of the determination table, which has been generated by the node 4, to the determination table illustrated in FIG. 7C, which has been received from the node 3. Referring to FIGS. 7A to 7G, the fourth column of the determination table may be "N4".

In FIG. 5, a signal flow for generating a determination table for the return route #3 from the node 4 to the node 1 illustrated in FIG. 1 is illustrated.

The node 4 compares the layer label and the support table of the node 4, and determines scores on a layer-by-layer basis, thereby generating a fifth column of the determination table.

In the case where the fifth column of the determination table is generated based on a support table different from the support table that has been used to generate the fourth column, the fifth column may include values different from the values included in the fourth column. The node 4 adds the fifth column of the determination table, which has been generated by the node 4, to the determination table illustrated in FIG. 7C, which has been received from the node 3, thereby generating a determination table illustrated in FIG. 7D. The node 4 transfers the layer label and the determination table illustrated in FIG. 7D to the node 3. Referring to FIGS. 7A to 7G, the fifth column of the determination table may be "N4'".

The node 3 compares the layer label and the support table of the node 3, and determines scores on a layer-by-layer basis, thereby generating a sixth column of the determination table. In the case where the sixth column of the determination table is generated based on a support table different from the support table that has been used to generate the third column, the sixth column may include values different from the values included in the third column. The node 3 adds the sixth column of the determination table, which has been generated by the node 3, to the determination table illustrated in FIG. 7D, which has been received from the node 4, thereby generating a determination table illustrated in FIG. 7E. The node 3 transfers the layer label and the determination table illustrated in FIG. 7E to the node 2. Referring to FIGS. 7A to 7G, the sixth column of the determination table may be "N3".

The node 2 compares the layer label and the support table of the node 2, and determines scores on a layer-by-layer basis, thereby generating a seventh column of the determination table. In the case where the seventh column of the determination table is generated based on a support table different from the support table that has been used to generate the second column, the seventh column may include values different from the values included in the second column. The node 2 adds the seventh column of the determination table, which has been generated by the node 2, to the determination table illustrated in FIG. 7E, which has been received from the node 3, thereby generating a determination table illustrated in FIG. 7F. The node 2 transfers the layer label and the determination table illustrated in FIG. 7F to the node 1. Referring to FIGS. 7A to 7G, the seventh column of the determination table may be "N2".

The node 1 compares the layer label and the support table of the node 1, and determines scores on a layer-by-layer basis, thereby generating an eighth column of the determination table. In the case where the eighth column of the determination table is generated based on a support table different from the support table that has been used to generate the first column, the eighth column may include values different from the values included in the first column. The node 1 adds the eighth column of the determination table, which has been generated by the node 1, to the determination table illustrated in FIG. 7F, which has been received from the node 2, thereby generating a determination table illustrated in FIG. 7G. Referring to FIGS. 7A to 7G, the eighth column of the determination table may be "N1".

Referring to FIG. 5, By using different support tables for the outward route #3 and the return route #3, different tunneling routes may be formed for the outward and return routes.

Referring to FIGS. 7A to 7G, the individual nodes have the same support table, and, consequently, give the same scores. The nodes may have support tables that are different on a node-by-node basis, and, consequently, may give different scores.

Generation of a determination table as described above is performed for each of multiple routes. For example, referring to FIG. 1, determination tables may be similarly generated also for the routes #2 and #3.

The node 1 summarizes the scores included in the determination tables that have been generated on a route-by-route basis, and determines a route having the highest score as an optimal route. The scores may be summarized on a layer-by-layer basis.

The node 1 sets the determined optimal route. FIG. 5 illustrates a case where the route #3 has been determined as an optimal route. When each of the nodes 1 to 4 provided along the route #3 sets the route and an ACK is returned, the node 1 registers the route #3.

Referring to FIG. 6, no determination table is generated for a return route, and, instead of the node 1, the node 4 summarizes determination tables and determines an optimal route. In FIG. 6, the other elements may be substantially the same as or similar to the elements illustrated in FIG. 5. Referring to FIG. 6, in the case where each of the nodes provided along the route #3 has the same support table for the outward route #3 and the return route #3, a tunneling route is formed in accordance with the three-way signal flow.

The set route is formed as a tunneling route between the node 1 and the node 4. For example, it is assumed that the node 1 illustrated in FIGS. 1, 5, and 6 relays, via the route #3, to the node 4, a main signal transmitted from an apparatus provided by a different vendor or from a different network. In the case where signal types for the OC layer and layers upper than the OC layer are not supported for the route #3, a tunneling route between the node 1 and the node 4 is formed. In the case where the signal type OCh, FEC#n, or OTUx is supported for the route #3, a transmission path along which a function, such as a warning function or a performance monitoring function, for the layers up to the OTU layer is provided may be formed between the node 1 and the node 4.

The signal types supported by the nodes provided along routes may be determined on a node-by-node basis or a layer-by-layer basis, and may be quantitatively evaluated, whereby a route along which a connection between apparatuses provided by different vendors or between different networks is guaranteed may be determined.

Configurations of Apparatuses

Figure 8:
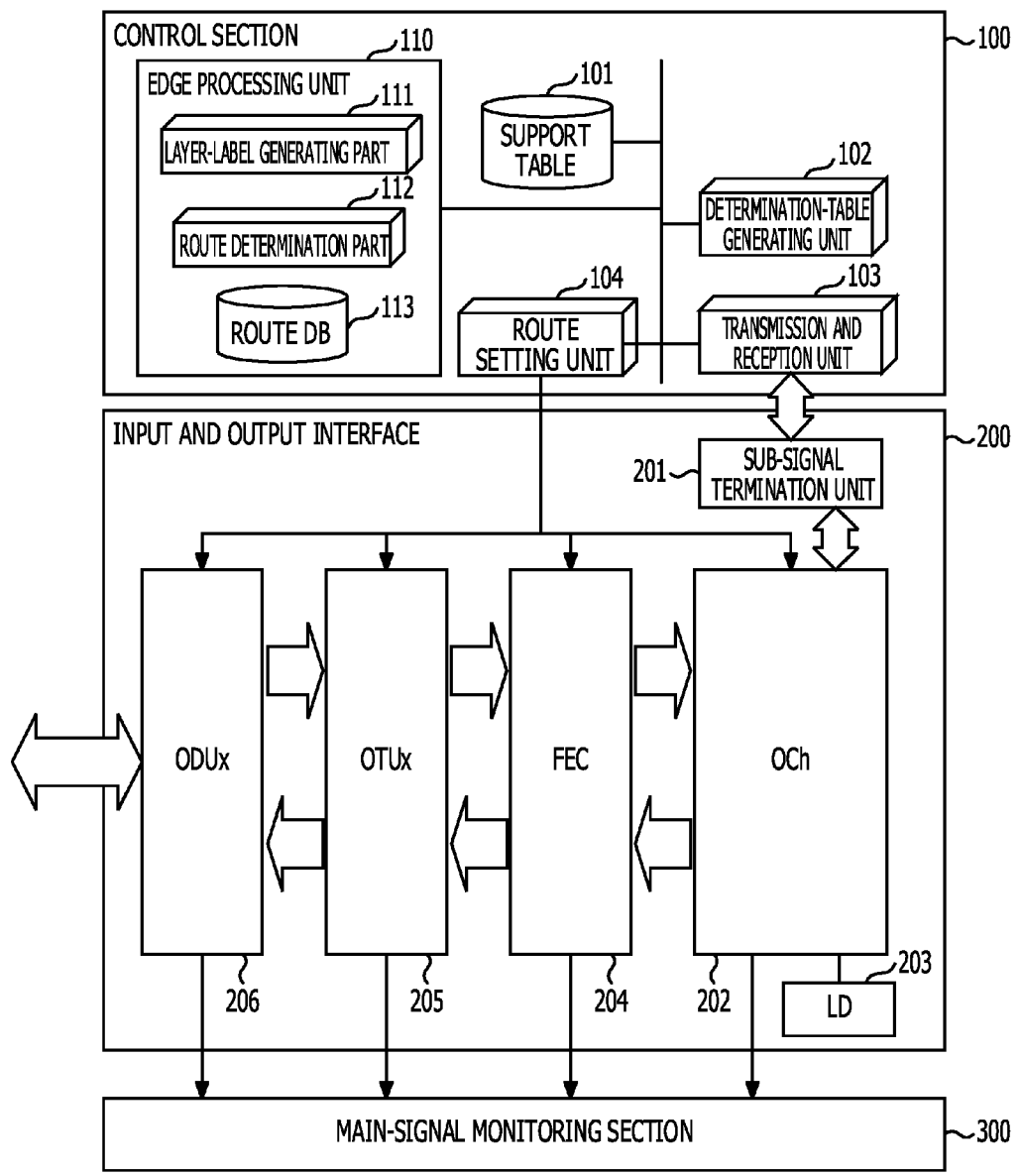
FIG. 8 illustrates an example of an edge node.

FIG. 8 illustrates an example of an edge node.

In FIG. 8, a functional block of the edge node is illustrated. The edge node may correspond to, for example, the node 1 or 4 illustrated in FIG. 1, 5, or 6. The edge node includes a control section 100, an input and output interface 200, and a main-signal monitoring section 300.

The control section 100 includes a support table 101, a determination-table generating unit 102, a transmission and reception unit 103, a route setting unit 104, and an edge processing unit 110.

The support table 101 may correspond to the support table illustrated in FIG. 4A. One support table may be present in each of the nodes provided along each of the routes. For example, one support table 101 may be shared between multiple routes or multiple nodes. The support table 101 may be stored in any storage device, or be held in any one of the elements included in the control section 100.

The determination-table generating unit 102 compares a layer label and the support table 101 on a layer-by-layer basis, and determines scores for the individual layers, thereby generating one column of the determination table illustrated in FIG. 4B. The edge node that is provided at an end point of a route, such as the node 4 illustrated in FIG. 5, adds one column generated by the node to a determination table received from the upstream node.

The transmission and reception unit 103 receives a determination table and a layer label that have been received by the input and output interface 200, and passes the determination table and the layer label on to the determination-table generating unit 102. The transmission and reception unit 103 transmits a determination table generated by the determination-table generating unit 102 and the layer label to the input and output interface 200.

The route setting unit 104 sets an optimal route determined by the route determination part 112. When setting of the route has been completed by nodes provided along the optimal route and the route setting unit 104 has received an ACK, the route setting unit 104 registers the set route in a route DB 113. For example, the route setting unit 104 may set multiple highest-scored routes that have been determined by the route determination part 112 and that have the highest score, whereby the route setting unit 104 may set redundant routes.

The edge processing unit 110 includes a layer-label generating part 111, a route determination part 112, and the route DB 113.

The layer-label generating part 111 generates the layer label generated in FIG. 3. The layer-label generating part 111 passes the generated layer label on to the determination-table generating unit 102 and the transmission and reception unit 103.

The route determination part 112 summarizes determination tables for individual routes, and determines a route having the highest score as an optimal route. The route determination part 112 passes the optimal route on to the route setting unit 104. For example, multiple highest-scored routes having the highest score may be determined. Multiple routes may be prioritized.

Route information is stored in the route DB 113. The route setting unit 104 stores route information in the route DB 113, thereby registering a route.

The input and output interface 200 includes a sub-signal termination unit 201, an OCh 202, an LD 203, an FEC 204, an OTUx 205, and an ODUx 206.

The sub-signal termination unit 201 terminates a sub-signal that is multiplexed into a main signal, and extracts a layer label and a determination table that are included in the sub-signal. The sub-signal termination unit 201 passes the layer label and the determination table, which have been extracted, on to the transmission and reception unit 103 of the control section 100.

The OCh 202 may be an optical module corresponding to 43G, 10.7G, 2.6G, or the like. The OCh 202 terminates an optical signal transmitted from a line, and transmits an optical signal to a line.

The LD 203 may be a laser diode that generates local light, and supplies the local light to the OCh 202 for coherent optical transmission.

The FEC 204 terminates the FEC area of a main signal received from the OCh 202, and performs error correction using information including the FEC area. The FEC 204 adds an FEC area to a main signal that is to be transmitted, and passes the main signal on to the OCh 202.

The OTUx 205 terminates the OTU overhead of a main signal received from the FEC 204. The OTUx 205 adds OTU overhead to a main signal that is to be transmitted, and passes the main signal on to the FEC 204.

The ODUx 206 terminates the ODU overhead of a main signal received from the OTUx 205. The ODUx 206 adds ODU overhead to a main signal that is to be transmitted, and passes the main signal on to the OTUx 205.

The main-signal monitoring section 300 monitors a warning or performance that are detected by the OCh 202, the LD 203, the FEC 204, the OTUx 205, or the ODUx 206.

Figure 9:
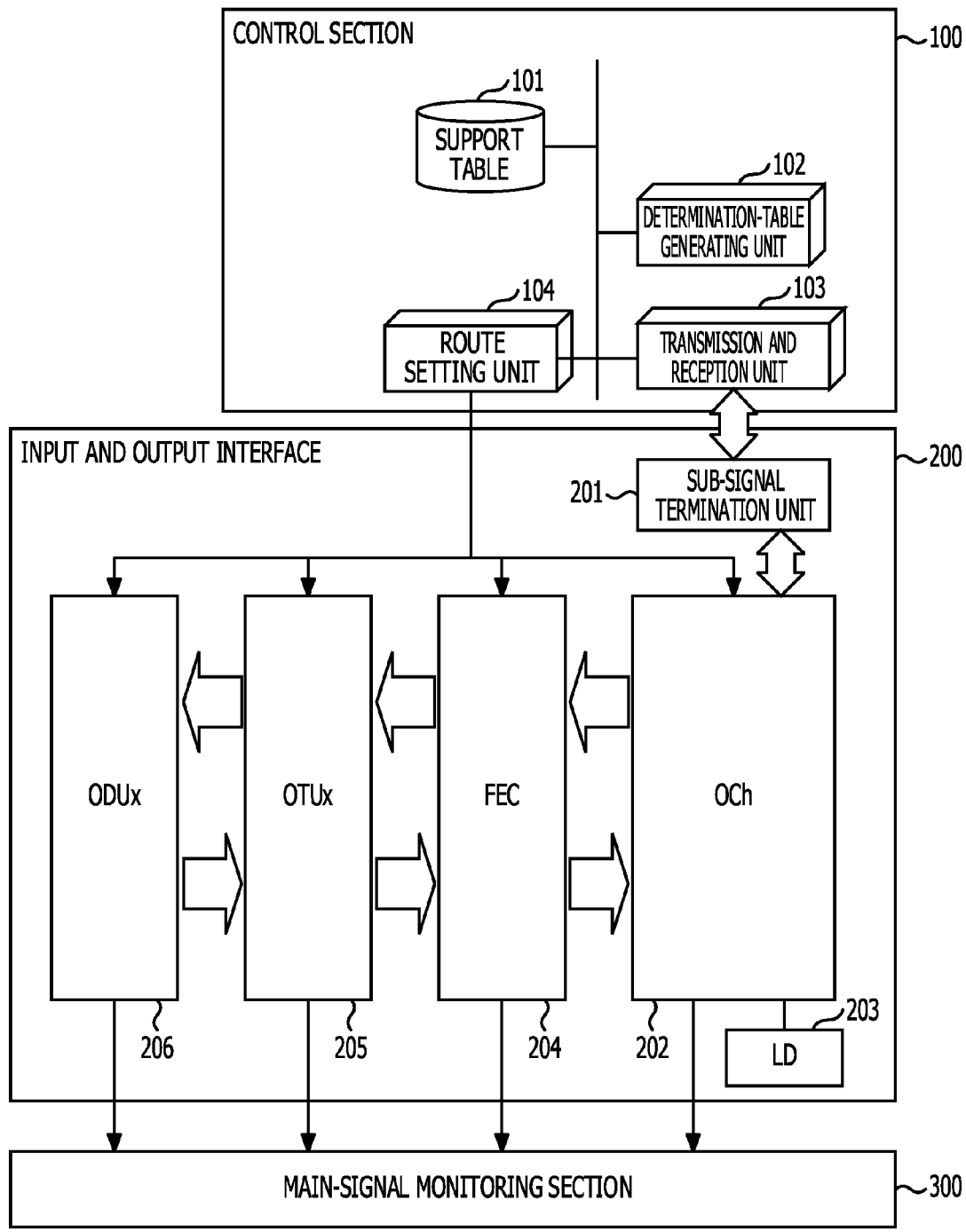
FIG. 9 illustrates an example of a relay node.

FIG. 9 illustrates an example of a relay node. In FIG. 9, a functional block diagram of the relay node is illustrated. The relay node may correspond to, for example, the node 2 or 3 illustrated in FIG. 1, 5, or 6. The relay node illustrated in FIG. 9 may include no edge processing unit. In FIG. 9, elements that are substantially the same as or similar to the elements illustrated in FIG. 8 may be denoted by the same reference numerals, and a description thereof may be omitted or reduced.

Figure 10:
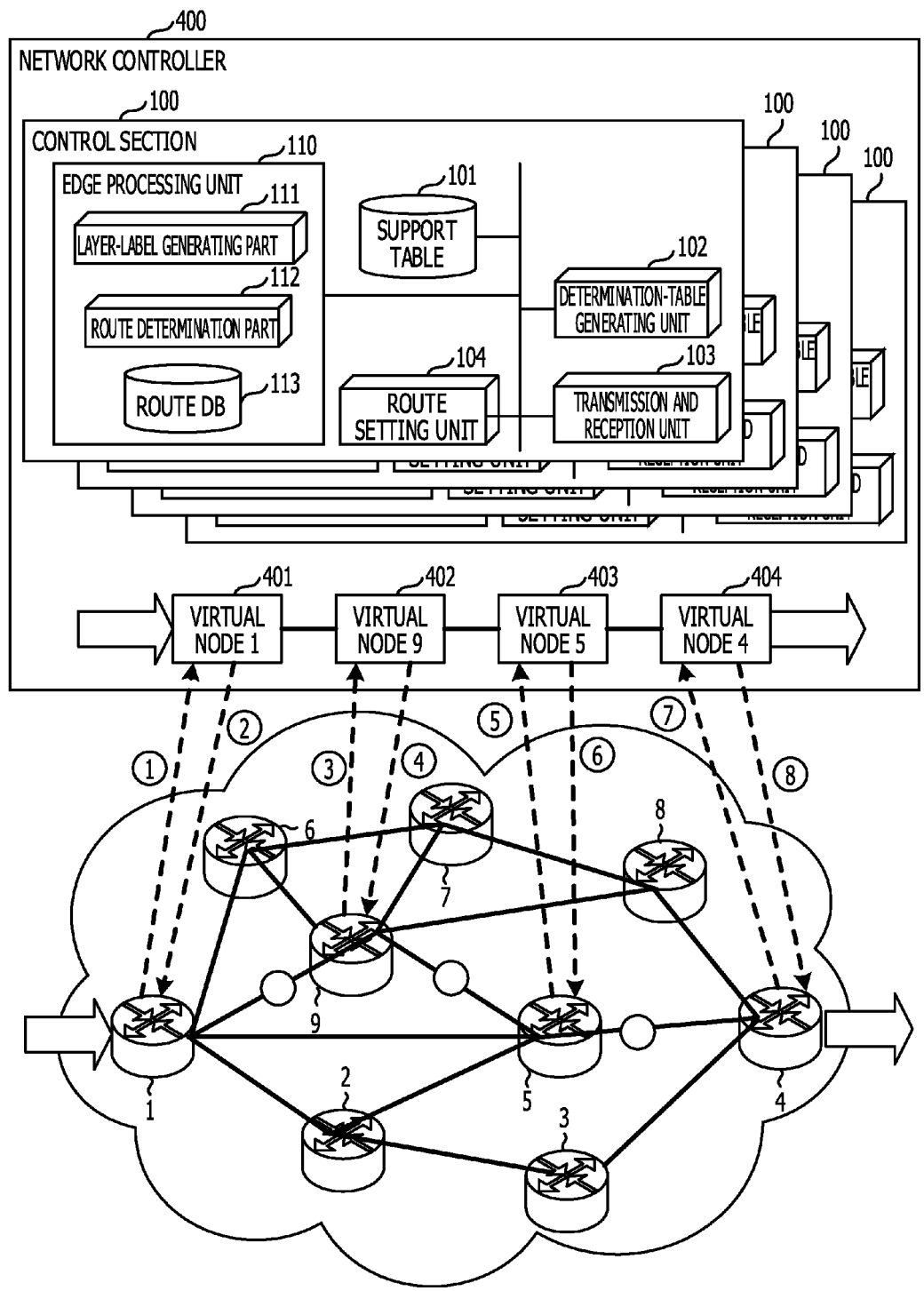
FIG. 10 illustrates an example of a network and an example of a network controller

FIG. 10 illustrates an example of a network and an example of a network controller. The network illustrated in FIG. 10 includes multiple nodes 1 to 9 as illustrated in FIG. 1. The network controller 400 is provided outside of the network. The network controller 400 includes control sections 100 and virtual nodes 401 to 404. The control section 100, which may correspond to the control section 100 illustrated in FIG. 8, is provided for each of the nodes 1 to 9. The virtual nodes 401 to 404 may correspond to the corresponding node in the network. The network controller 400 may perform the similar process to the process which is performed in the control section 100 illustrated in FIG. 8. For example, the nodes 1, 9, 5 and 4 in the network transmit a message Label-In, which are encircled odd number 1, 3, 5 and 7, respectively, to the corresponding virtual node 401, 402, 403 or 404 in the network controller upon receiving a message of the layer label. For example, the corresponding virtual node 401, 402, 403 and 404 in the network transmit a message Label-Out, which are encircled even number 2, 4, 6 and 8, respectively, to the corresponding node in the network. The transmissions of the message Label-In and the message Label-Out may not be performed contemporaneously. The transmissions may perform in the order of the encircled numbers 1 to 8. After receiving the message Label-In (for example, the encircled number 1), the network controller performs the above processes, such as comparing information in the layer label and information of the node which transmits the message Label-In, determining scores or the like, based on the message Label-In. After a completion of the process by the network controller, the corresponding virtual node (for example, the virtual node 401) transmits a message Label-Out (for example, the encircled number 2) to the node (for example, the node 1) and instructs the node (for example, the node 1) to transmit a message to the next node (for example, the node 2).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A route setting apparatus, comprising:
a processor; and
a memory which stores an instruction to cause the processor to:
acquire a layer label in which a first signal type for transmission of a main signal is described on a layer-by-layer basis;

receive first data including a first score on a layer-by-layer basis from a first apparatus;

generate second data for one of second signal types that matches the first signal type in the layer label based on one or more second scores associated with respective one or more second signal types on a layer-by-layer basis; and transmit the first data and the second data to a second apparatus that is different from the first apparatus to determine an optimal route for the transmission of the main signal based on the first data and the second data.

2. The route setting apparatus according claim 1, wherein the layer label is exchanged using a sub-signal that is multiplexed into the main signal.

3. The route setting apparatus according claim 1, wherein the layer label is exchanged using multicast or broadcast.

4. The route setting apparatus according claim 1, wherein a plurality of highest-scored routes having a highest score are determined.

5. The route setting apparatus according claim 1, wherein the processor acquires the layer label by generating the layer label or receiving the layer label from the first apparatus.

6. The route setting apparatus according claim 1, wherein the second data includes one or more second score for the one of the second signal types.

7. The route setting apparatus according claim 6, wherein the processor summarizes the first score included in the first data and the one or more second score in the second data on a layer-by-layer basis, and determines a route having the highest score as the optimal route.

8. A route setting method, comprising:

acquiring a layer label in which a first signal type for transmission of a main signal are respectively described on a layer-by-layer basis;

receiving first data including a first score on a layer-by-layer basis from a first apparatus;

generating second data for one of second signal types which matches the first signal type in the layer label based on one or more second scores associated with respective one or more second signal types on a layer-by-layer basis;

transmitting the first data and the second data to a second apparatus that is different from the first apparatus; and determining an optimal route for the transmission of the main signal based on the first data and the second data.

9. The route setting method according claim 8, wherein the layer label is provided using a sub-signal that is multiplexed into the main signal.

10. The route setting method according claim 8, wherein the layer label is provided using multicast or broadcast.

11. The route setting method according claim 8, comprising, determining a plurality of highest-scored routes having a highest score.

12. The route setting method according claim 8, wherein the acquiring is performed by generating the layer label or receiving the layer label from the first apparatus.

13. The route setting method according claim 8, wherein the second data includes one or more second score for the one of the second signal types.

14. The route setting method according claim 8, further comprising:

summarizing the first score included in the first data and the one or more second score in the second data on a layer-by-layer basis to determine a route having the highest score as the optimal route.

15. The route setting method according to claim 8, wherein the main signal is provided by forming a tunneling route formed as having a highest of scores associated with one or more of the second signal types.

16. The route setting method according to claim 8, wherein the main signal is transmitted via a route with a highest score among nodes of the one or more second signal type.

17. The route setting method according to claim 8, comprising:

comparing the layer label and signal type supported by a node on a layer-by-layer basis and adding a score of the node based on the comparing; and transferring the layer label to a next-stage node.

18. The route setting method according to claim 17, wherein a pass-through score is used when determining the second signal types do not match the first signal type.

19. A network system, comprising:

a network including nodes; and a network controller configured to control the nodes, the network controller includes:

a processor; and a memory which stores an instruction to cause the processor to:

acquire a layer label in which a first signal type for transmission of a main signal is described on a layer-by-layer basis;

receive first data including a first score on a layer-by-layer basis from a first node included in the nodes;

generate second data for one of second signal types that matches the first signal type in the layer label based on one or more second scores associated with respective one or more second signal types on a layer-by-layer basis; and transmit the first data and the second data to a second node included in the nodes and is different from the first node to determine an optimal route for the transmission of the main signal based on the first data and the second data.

* * * * *